United States Patent [19]

Scherzer

[11] 4,347,164

[45] Aug. 31, 1982

[54] MONO- AND POLY-METALLIC SUPPORTED CATALYSTS

[75] Inventor: Julius Scherzer, Anaheim, Calif.

[73] Assignee: Filtrol Corporation, Los Angeles, Calif.

[21] Appl. No.: 214,212

[22] Filed: Dec. 8, 1980

[51] Int. Cl.³ .................. B01J 29/10; B01J 29/20; B01J 27/26
[52] U.S. Cl. .................. 252/455 Z; 252/438; 423/112
[58] Field of Search ............ 252/455 Z, 438; 423/112, 118

[56] References Cited

U.S. PATENT DOCUMENTS

| 2,417,034 | 3/1947 | Youker | 252/438 X |
| 2,658,931 | 11/1953 | Drake et al. | 252/438 X |
| 2,666,748 | 1/1954 | Arthur, Jr. et al. | 252/438 |
| 3,013,990 | 12/1961 | Breck et al. | 252/455 Z |
| 3,867,472 | 2/1975 | Tazuma et al. | 252/438 X |
| 4,276,199 | 6/1981 | Hoxmeier | 252/438 |
| 4,285,875 | 8/1981 | Cornils et al. | 252/438 X |

Primary Examiner—Carl F. Dees
Attorney, Agent, or Firm—Paul E. Calrow; Andrew E. Barlay

[57] ABSTRACT

A zeolite containing catalyst which is associated with finely dispersed metal is formed by decomposing a compound, whose anion contains a metal and a (CN) radical, which has been deposited on the host catalyst.

7 Claims, No Drawings

MONO- AND POLY-METALLIC SUPPORTED CATALYSTS

STATEMENT OF THE DISCLOSURE

This invention relates to catalyst comprising a substrate upon which is deposited elementary metal particles of size which are not detectable by X-ray radiation. We refer to such particles as finely dispersed. The metal particles may be mono-metallic where they are all the same element or they may be poly-metallic where they are of two or more different elements.

The catalysts of our inventions are formed by reacting a soluble compound whose anion contains a metal and a (CN) radical with a zeolite which carries a metal cation in exchange position to form a substantially insoluble precipitate. The zeolite may be any of the well known zeolites which are described in Breck's "Molecular Sieves" published by John Wiley and Sons.

The cations may be any of the cations which form such insoluble compounds known to those skilled in the art and which are described or listed in standard texts such as Chemical Rubber Handbook. For example, where the soluble compound is a ferro or ferri cyanide, such cations are those of the transition elements, Groups 1b through 7b and 8, and also the rare earth element of the Lanthanide Series of the Periodic Table or mixtures of some or all of the said elements, for example, cobalt, copper, iron, manganese, nickel, silver, tin and zinc. Examples of soluble ferro- and ferricyanides are the ammonium and the alkyli metal ferro- or ferricyanides.

By reacting a water solutin of the soluble cyanide with a suitable crystalline zeolite containing one of the aforesaid cations, a finely divided precipitate of the insoluble cyanide is deposited throughout the crystalline solids. Upon heating the zeolite in an inert atmopshere, a product is obtained which depends upon the conditions of calcination such as the environment, temperature and time. If the calcination is carried out in a reducing atmosphere, the product will be composed of fine elementary metal originating from the cation and anion of the precipitatated compound. Where the environment is an oxidizing environment, such as air or contains reactive gases such as sulfides which can form sulfides with the metal, the metal is converted in part or in whole into the oxide or sulfide, as the case may be.

To prepare a mono-metallic catalyst, the soluble metal cyanide is reacted with a zeolite containing metallic cation of the same element as is in the anion of the soluble compound.

In such case, the zeolite desirably should not contain any cations other than the anionic metal. To form the poly-metalic catalysts, we employ a zeolite having a metal in exchange position which is other than the anionic metals of the soluble compound.

Thus, for example, we may use any of the cations referred to above as the metal in the exchange position in the zeolite and use a different metal as the metal in the anion of the soluble compound, which with metal in exchange position forms an insoluble precipitate. Examples of such soluble compounds are the ammonium and alkali metal ferro- and ferricyanides and the cyanocobaltates to form the insoluble ferro- and ferricyande or the insoluable cyano- cobaltate.

The product obtained is a mono- or polymetallic catalyst, dispersed throughout the zeolite. The size of the metal particles is below the detection limit of powder X-ray diffraction methods (K Alpha Copper radiation) and is indicative of the high degree of dispersion. The composition, degree of dispersion and activity of these zeolite supported metallic catalysts can vary, depending upon a number of reaction parameters (e.g., initial metal content of the zeolite, ratio between metal cation and metal containing anion during reaction, calcination conditions, et al.). Depending upon the nature of the metals, of the complex anion and of the calcination conditions, the catalyst can also contain finely dispersed carbides, nitrides or other thermal decomposition products.

Due to the location of the metal cations at specific sites in the zeolite and the more uniform distribution of the reaction products, a uniform dispersion of the metal particles is obtained. The formation of other dispersed products (e.g. carbides) during the thermal decomposition of the complexes may also prove advantageous in some catalytic reaction, as for example, the Fischer-Tropsch process exemplified herein.

EXAMPLE 1

Monometallic Supported Catalysts

The preparation of such a catalyst is exemplified by the following procedure for preparation of an iron catalyst supported on Y zeolite.

A ferrous ion exchanged zeolite is prepared by a conventional procedure, e.g., by treating an ammonium exchanged zeolite of the Y type (Breck U.S. Pat. No. 3,130,007) with a solution of $FeSO_4$ in an inert atmosphere. The exchanged zeolite is then treated with the solution of a compound that contains iron in a complex cyanide, e.g., $Fe(CN)_6^{4-}$, $Fe(CN)_6^{3-}$, $Fe(CN)_5NO^{2-}$, et al. If $K_3Fe(CN)_6$ is used in the reaction, a dark-blue product results. It contains a mixture of $Fe_3[Fe(CN)_6]_2$ and $FeK[Fe(CN)_6]$ dispersed within and on the surface of the zeolite. Calcination results in iron dispersed throughout the zeolite in a form that depends upon calcination conditions (environment, temperature, time). Calcination in a stream of hydrogen results in a black-gray material, containing finely dispersed iron in the zeolite. The zeolite is after calcination primarily in the potassium exchanged form. When $(NH_4)_3Fe(CN)_6$ is used in the process, the zeolite ends up in the H— or decationated form. Depending upon reacting conditions, some of the iron can also remain in cationic form in the zeolite.

A similar procedure can be used to prepare other monometallic, zeolite supported catalysts. The procedure is useful especially in those instances in which the metal exchanged form of the zeolite is difficult to reduce to the metallic form by heating in a reducing atmosphere. The above procedure is further illustrated by the following Examples 2 and 3.

EXAMPLE 2

A NaY ($SiO_2/Al_2O_3$ molar ratio equal to 5.0) zeolite was exchanged twice with a 10% ammonium sulfate solution, for one hour each. The first exchange was carried out at room temperature and the second exchange at 90° C. The slurry contained 10% zeolite. The exchanged zeolite was filtered, washed sulfate free, dried at 105° C. for one (1) hour and calcined at 370° C. for two (2) hours. The calcined material was treated twice with an ammonium sulfate solution at 90° C, for one (1) hour each. In these two ammonium exchanges, the weight ratio zeolite (volatile free) to ammonium sulfate to water was 1 to 2 to 10. The material was filtered, washed sulfate free and dried at 105° C. for two (2) hours. The resulting NH$_4$ Y zeolite contained 0.75 weight percent Na$_2$O.

One hundred (100) grams of NH$_4$ Y zeolite was reacted with a ten (10) weight percent ferrous sulfate solution for three (3) hours at room temperature with stirring. The slurry contained 10% zeolite. To prevent the oxidation of the ferrous ion, the reaction was carried out under a nitrogen atmosphere. The resulting Fe, NH$_4$—Y zeolite was filtered, washed sulfate free (under nitrogen) and vacuum-dried at 65° C. for ninety (90) minutes. The material contained 3.9% Fe.

Fifty (50) grams (volatile free) of the iron exchanged zeolite was slurried in 250 ml. of water. The slurry was then reacted with 250 ml. of a solution containing seven (7) grams of (NH$_4$)$_4$ Fe(CN)$_6$.H$_2$O. The reaction was carried out for four (4) hours at room temperature with stirring, under a nitrogen atmosphere. The product was pale-blue, probably due to the presence of some trivalent iron. It was filtered, washed and vacuum-dried at 65° C. for one (1) hour. The final product contains 4.65% iron and has a surface ae of 479 m$^2$/g. In addition to the zeolite peaks, the x-ray diffraction pattern shows peaks at two (2) theta of 17.5, 24.7 and 35.3°, corresponding to the complex iron cyanide ion. The infrared spectrum shows a 2090 cm$^{-1}$ band, characteristic of the CN group indicating the presence of the cyanide complex.

Calcination of this material at 400° C. for four (4) hours yields a black product, containing finely dispersed iron.

EXAMPLE 3

A product similar to that described in Example 2 was prepared by the same procedure, except for using 16 grams of K$_4$Fe(CN)$_6$.3H$_2$O in the reaction instead of 7 grams of (NH$_4$)$_4$Fe(CN)$_6$.H$_2$O. The product contained 4.5 weight percent Fe and 7.4 weight percent K$_2$O. It had a surface area of 512 M$^2$/grams.

EXAMPLE 6

A NaY (SiO$_2$/Al$_2$O$_3$ of molar ratio of 5.0) zeolite was exchanged twice with 10% ammonium sulfate solution at 90° C., for one (1) hour each. The material was filtered, washed sulfate free, dried at 105° C. for 1 hour and calcined at 540° C. for 2 hours. The calcined product was again ammonium exchanged twice, as described, filtered, washed sulfate free and dried at 105° for 1 hour. The zeolite contained about 0.2% Na$_2$O.

The ammonium Y zeolite was exchanged with a 10% cobalt nitrate solution at 90° C., for 1 hour. The slurry contained 10% zeolite. The cobalt exchanged zeolite (CoY) was filtered, washed nitrate free and dried at 105° C. for 2 hours. The product contained 5.0% cobalt.

The CoY zeolite was slurried in water and treated slowly with a solution of K$_4$Fe(CN)$_6$, under stirring at room temperature for 30 minutes. The weight ratio of zeolite (on a volatile free basis) to K$_4$Fe(CN)$_6$ to water was 5 to 1 to 30. The product was filtered, water washed and dried under vacuum for 1 hour at 65° C. Chemical analysis, X-ray and infra-red data obtained for this material indicate the presence in the zeolite of a mixture of Co$_2$Fe(CN)$_6$ and CoK$_2$Fe(CN)$_6$ at a ratio of about 1 to 3 (3.4% Co; 3.8% Fe$_2$O$_3$). The material is violet in color and had a surface area=575 M$^2$/g.

Calcination at 200°, 400° and 475° C. in nitrogen results in a progressive loss of CN groups, as shown by the infrared spectra. After calcination at 475° C., the infrared spectrum of this material shows the presence only of a weak absorption band at about 2100 cm$^{-1}$, indicating that most of the CN groups have been eliminated. The calcined materials are dark-gray. They contain an undefined residue dispersed in the zeolite, that includes carbides, nitrides, carbon and the free metals. Calcination under hydrogen at 400° C. yields a product which contains predominantly metals dispersed in the zeolite substantially free of carbides, nitrides or carbon.

EXAMPLE 5

An ammonium exchanged Y zeolite was prepared from NaY as described in Example 4, except for calcining at 370° C. instead of 540° for two hours. The exchanged zeolite contained 0.75% Na$_2$O. The lower calcination temperature was used in order to minimize decationization so as to maintain a higher exchange capacity in the zeolite.

The ammonium Y zeolite was exchanged with 10% cobalt nitrate solution as described in Example 4. The resulting cobalt Y zeolite contained 6.3% Co (on a volatile free basis).

The CoY zeolite was slurried in water and treated slowly with a solution of (NH$_4$)$_4$ Fe(CN)$_6$.H$_2$O under stirring. The weight ratio of zeolite (on a volatile free basis) to (NH$_4$)$_4$Fe(CN)$_6$ to water was 3 to 1 to 30. The slurry was filtered, washed and dried. Calcination in a hydrogen stream at 400° C. for 4 hours results in a black product, containing finely dispersed cobalt and iron (4.35% Co; 3.6% Fe) undetectable by X-ray analysis.

EXAMPLE 6

A CoY zeolite was prepared as described in Example 4. It was then reacted with K$_3$Fe(CN)$_6$. Chemical analysis and IR data obtained for the violet product indicate the presence primarily of Co$_3$[Fe(CN)$_6$]$_2$ dispersed in the zeolite (3.36% Co; 2.91% Fe$_2$O$_3$). Its surface area is 597 m$^2$/g. Calcination at 200°, 400° and 475° C. in nitrogen leads to dark-gray products, similar to those described in Example 4. Calcination in hydrogen at 400° C. leads to a black product, containing finely dispersed cobalt and iron undetectable by X-ray.

EXAMPLE 7

A nickel exchange Y zeolite (NiY) was prepared by a procedure similar to the one described for CoY in Example 4, except that nickel nitrate instead of cobalt nitrate was used in the exchange process. The resulting NiY contained 4.1% Ni.

This material was then reacted with K$_4$Fe(CN)$_6$, as described in Example 4. The dried product is pale-green. Chemical analysis, X-ray and infra-red data indicate the presence in the zeolite of a mixture of Ni$_2$Fe(CN)$_6$ and Ni K$_2$Fe(CN)$_6$ at a weight ratio close to 1 to 1 (3.59% Ni; 2.35% Fe. It has a surface area of 571 m$^2$/g. Calcination in nitrogen at 200°, 400° and 475° C. leads to dark-gray products. The infrared spectrum of the material calcined at 475° shows only a weak absorption band at about 2100 cm$^{-1}$, indicating that most of the CN groups have been eliminated. Calcination in hydrogen at 400° C. leads to reduced nickel and iron dispersed in the zeolite undetectable by X-ray.

EXAMPLE 8

An ammonium exchanged Y zeolite (NH$_4$Y) was prepared as described in Example 4. The zeolite was then iron exchanged by slurrying it in a solution of ferrous sulfate for 3 hours at room temperature. The weight ratio zeolite (volatile free) to iron sulfate to water was 1 to 1 to 10. The exchange was carried out under nitrogen, to prevent the oxidation of the $Fe^{2+}$ ions. The iron exchanged zeolite was filtered, washed sulfate free (under nitrogen), and dried at 65° C. for one hour under vacuum.

The iron exchanged zeolite was treated with a solution of $K_3Co(CN)_6$ for 30 minutes at room temperature, with stirring. The weight ratio of zeolite (volatile free) to $K_3Co(CN)_6$ to water was 5 to 1 to 30. The treatment was done under nitrogen, to prevent the oxidation of the ferrous ion. The zeolite was filtered, washed and dried at 65° C. for one hour under vacuum. A bright-yellow product was obtained, containing cyanocobaltate ions. Chemical analysis, X-ray and infrared data suggest that only part of the zeolite $Fe^{2+}$ ions react with cyanocobaltate, forming primarily $Fe_3[Co(CN)_6]_2$.

Calcination in nitrogen leads to gradual loss of CN groups and results in dark-gray products. Calcination in hydrogen at 400° C. results in a zeolite containing dispersed iron and cobalt (3.4% Fe; 1.6% Co) undetectable by X-ray.

EXAMPLE 9

NaY zeolite was ammonium exchanged with 10% $(NH_4)_2SO_4$ solution at room temperature for one hour. The slurry contained 10% zeolite. The exchange was then repeated with a fresh 10% $(NH_4)_2SO_4$ solution at 90° C. for one hour. Two additional ammonium exchanges were carried out at 90° C. for one hour each, using a 20% $(NH_4)_2SO_4$ solution (weight ratio of zeolite to $(NH_4)_2SO_4$ to water was 1 to 2 to 10). After the exchange, the zeolite contains 1.2% $Na_2O$.

A portion of the ammonium Y zeolite was treated with a 10% $Cu(NO_3)_2$ solution at 90° C. for 1 hour (weight ratio of zeolite (volatile free) to $Cu(NO_3)_2$ to water was 1 to 1 to 10). The resulting $CuNH_4Y$ zeolite was dried at 105° C. for 2 hours. 30 gm of this material were reacted with a 10% solution $K_3Co(CN)_6$ for six (6) hours at room temperature, using 3.63 g solution of complex per gram of zeolite. The resulting light-blue product was filtered, washed and dried at 105° C. for 2 hours.

The dry material was subsequently reduced in a flow of hydrogen at 400° C. for 4 hours. A black product resulted, containing finely dispersed copper and cobalt (3.6% Co; 5.5% Cu). The X-ray data of this material show no X-ray detectable metallic phases.

EXAMPLE 10

A $CuNH_4Y$ zeolite was prepared as described in Example 9. 30 gm of this material was reacted with a 10% $Na_2Fe(CN)_5NO.2H_2O$ solution for 6 hours at room temperature, using 3.26 g solution of complex per gram of zeolite. The resulting light-green product was filtered, washed, dried and reduced in hydrogen at 400° C. The black product contained finely dispersed copper and iron (6.2% Cu; 4.3% Fe).

EXAMPLE 11

This example illustrates the applicability of our catalyst for Fischer-Tropsch reactions. For illustration we use the zeolite containing reduced iron and cobalt, prepared according to the procedure described in Example 5. It contains 3.6% Fe and 4.3% Co. The Y zeolite is partially in the hydrogen form due to deamination of the $NH_4$ ion of the zeolite during calcination.

The experiments were carried out in a conventional flow reactor using 2 g of catalyst for each test. The reactor was first purged with helium, than a flow of hydrogen was passed over the catalyst at 400° C. for 2 hours. Subsequently, CO and $H_2$ mixtures were introduced into the reactor under atmospheric pressure. The total outflow from the reactor was passed through a liquid trap, then into a gas trap where the gas was trapped over water. A gas sample was taken from the trap and analyzed in a gas chromatograph.

The results of catalytic evaluation are given in Tables 1 and 2.

These data show that $CO-H_2$ mixtures are converted into hydrocarbon mixtures over the iron and cobalt containing zeolite. Under the reaction conditions described, the main reaction product is methane, with $C_2-C_5$ hydrocarbons of varying yields, depending upon reaction temperature, space velocity, $H_2/CO$ ratio, et al. An increase in space velocity at constant reaction temperature favors the increase in olefinic $C_2$ and $C_3$ yields, but a decrease in olefinic $C_4$—see runs #4 through #7. This applies to $H_2/CO$ ratios of 2 to 1 (Table 1) as well as 3 to 1—see runs #8 through 10 (Table 2).

The data given below illustrate applicability of these zeolitic materials as catalysts in the synthesis of hydrocarbons from $H_2/CO$ mixtures.

TABLE 1

| Run No. | 1 | 2 | 3 | 4 | 5 | 6 | 7 |
|---|---|---|---|---|---|---|---|
| Reaction conditions: | | | | | | | |
| $H_2/CO$ mole ratio | 2:1 | 2:1 | 2:1 | 2:1 | 2:1 | 2:1 | 2:1 |
| GHSV, $hr^{-1}$** | 170 | 170 | 170 | 190 | 350 | 580 | 910 |
| Reaction time, min. | 45 | 45 | 45 | 30 | 30 | 30 | 30 |
| Reaction temp., °C. | 275 | 300 | 325 | 275 | 275 | 275 | 275 |
| Normalized product distribution, mole % | | | | | | | |
| $CH_4$ | 74 | 71 | 71 | 72 | 75 | 73 | 73 |
| $C_2H_4$ | 5.1 | 7.3 | 10.4 | 9.4 | 10.1 | 12.6 | 14.0 |
| $C_2H_6$ | 8.8 | 7.6 | 5.5 | 6.8 | 6.0 | 3.6 | 3.5 |
| $C_3H_8$ | 2.0 | 2.3 | 2.4 | 1.6 | * | 0.3 | * |
| $C_4H_8$ | 6.2 | 7.8 | 6.9 | 7.6 | 5.2 | 4.0 | 3.6 |
| $C_4H_{10}$ | 0.5 | 0.5 | * | * | * | * | * |
| $C_5^+$ | 1.3 | 1.8 | 1.1 | 0.3 | * | 0.6 | * |

*Less than 0.2 mole %.
**gas hourly space velocity

TABLE 2

| Run No. | 8 | 9 | 10 |
|---|---|---|---|
| Reaction conditions: | | | |
| $H_2/CO$ mole ratio | 3:1 | 3:1 | 3:1 |
| GHSV, $hr^{-1}$** | 170 | 320 | 930 |
| Reaction time, min. | 30 | 30 | 30 |
| Reaction temp., °C. | 300 | 300 | 300 |
| Normalized product distribution, mole %: | | | |
| $CH_4$ | 74 | 74 | 74 |
| $C_2H_4$ | 6.1 | 9.5 | 13.5 |
| $C_2H_6$ | 8.4 | 5.6 | 3.5 |
| $C_3H_6$ | 1.8 | 3.1 | 6.1 |
| $C_3H_8$ | 2.1 | 1.5 | * |
| $C_4H_8$ | 6.5 | 6.0 | 2.9 |
| $C_4H_{10}$ | * | * | * |
| $C_5^+$ | 1.2 | 0.9 | * |

*Less than 0.2 mole %
**Gas hourly space velocity

Depending on the process to be catalyzed by the catalyst of our invention, the weight percent of the metal based on the zeolite may vary from about 0.1% to 15% by weight based on the zeolite plus the metal on a volatile free basis.

The best mode of our invention now known to us is the catalyst of Example 5 and the process of Example 11.

I claim :

1. A process for preparing a zeolite containing uniformly distributed, finely divided metal particles which comprises treating a Y-type zeolite having a metal cation in exchangeable position with an aqueous solution containing a complex cyanide salt dissolved therein, the anion of the complex salt being capable of forming a water-insoluble salt with the exchangeable cation of the zeolite, exchanging the cation of the complex salt with the exchangeable cation of the zeolite and reacting the anion of the complex salt with the exchanged cation of the zeolite, separating the treated zeolite from the solution, drying the zeolite and subjecting the dried zeolite to a reducing gas treatment to decompose the cyanide and to form finely dispersed metal particles in the zeolite of a size below the limits of detection by x-ray radiation.

2. A process according to claim 1 wherein the zeolite contains after the treatment with the complex cyanide salt at least one of the metals selected from the group consisting of cobalt, iron, copper, manganese, nickel, tin, zinc, a rare earth metal of the Lanthanide series.

3. A process according to claim 1 wherein the anion of the complex cyanide salt is ferro or ferricyanide.

4. A process according to claim 1 wherein the exchangeable cation of the zeolite is selected from the group consisting of transition metal and rare earth metals or mixtures thereof.

5. A process according to claim 1 wherein the exchangeable cation of the zeolite and the cation of the complex cyanide salt are the same.

6. A process according to claim 1 wherein the exchangeable cation of the zeolite and the cation of the complex cyanide salt are different.

7. A process according to claim 1 wherein the quantity of dispersed metal particles in the zeolite is in the range from about 0.1% to about 15% by weight, based on the total weight of the volatile-free treated zeolite.

* * * * *